L. J. JOHNSON.
SPROCKET.
APPLICATION FILED FEB. 16, 1917.
1,257,712.
Patented Feb. 26, 1918.
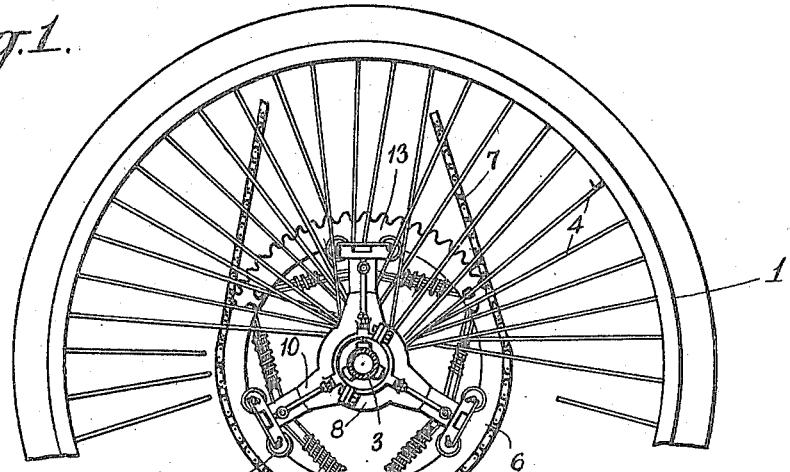
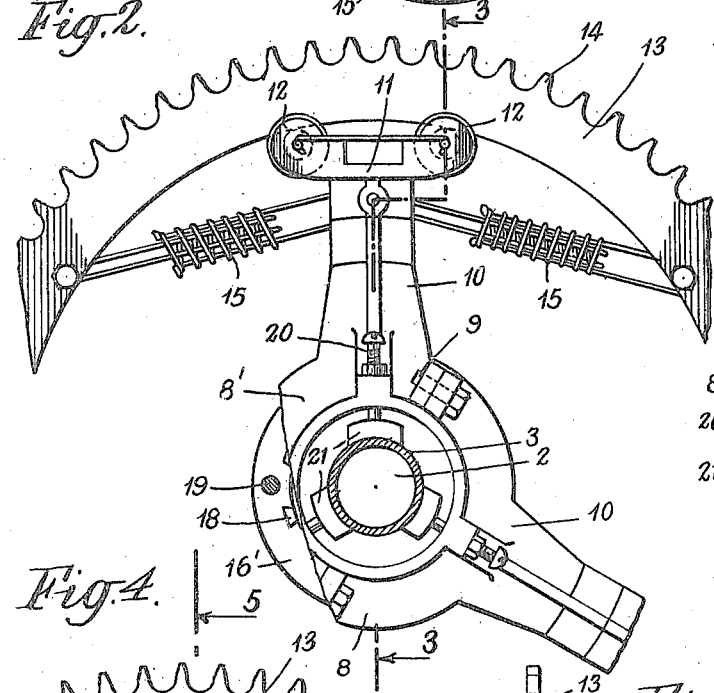
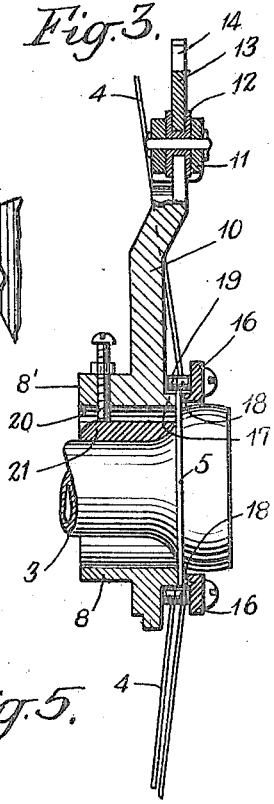
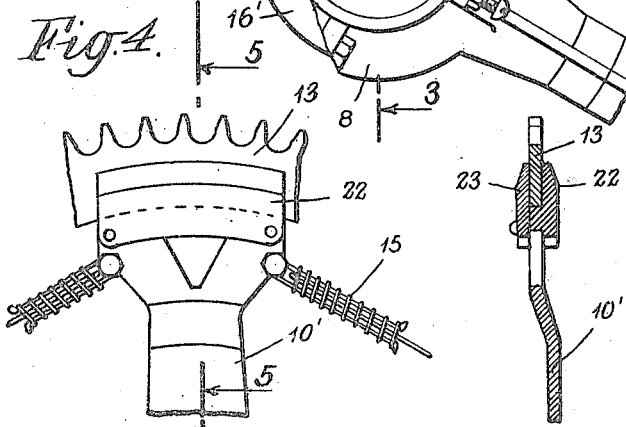
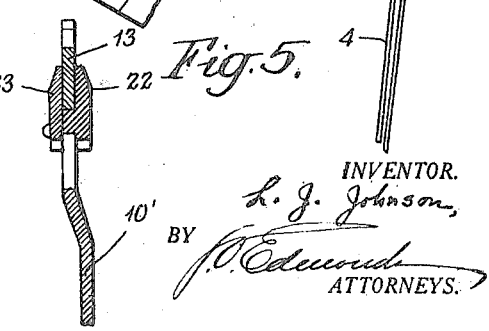
INVENTOR.
L. J. Johnson,
BY
ATTORNEYS.

UNITED STATES PATENT OFFICE.

LOUIS J. JOHNSON, OF TERRE HAUTE, INDIANA.

SPROCKET.

1,257,712.

Specification of Letters Patent.

Patented Feb. 26, 1918.

Original application filed April 27, 1916, Serial No. 93,917. Divided and this application filed February 16, 1917. Serial No. 149,015.

*To all whom it may concern:*

Be it known that I, LOUIS J. JOHNSON, a citizen of the United States, residing at Terre Haute, in the county of Vigo and State of Indiana, have invented certain new and useful Improvements in Sprockets, of which the following is a specification.

My invention relates to sprockets and means to attaching the same to a wheel, such as the wheel of a bicycle. The present application is a division of my application Serial No. 93,917, filed April 27, 1916, motor driven bicycles, which describes devices whereby a suitable motor may be readily and efficiently attached to a bicycle to transform the same into a motorcycle. The sprocket forming the subject-matter of my present application is intended primarily for attachment to the wheel of a bicycle to allow the same to be driven from a motor by means of a sprocket-chain, although its usefulness is not limited to this example. My object is to provide a sprocket-wheel in which the rim is not rigidly attached to the hub of the sprocket, but is resiliently secured thereto by means of springs constituting a shock-absorbing mechanism; also so forming the sprocket that it may readily be installed on various forms of bicycle or other wheel without alteration of the latter. Preferably, the sprocket, when adjusted, engages the spoke flange of the hub of the wheel to which it is secured, with inner and outer parts of the sprocket-wheel construction engaging opposite sides of the spoke flange.

In order that a clearer understanding of my invention may be had, attention is hereby directed to the accompanying drawings forming part of this application and illustrating certain embodiments of my invention. In the drawings Figure 1 represents a side elevation of a wheel having my improved socket secured thereto, Fig. 2 is a partially enlarged side elevation of a form of sprocket-wheel mounted on the coaster-brake hub of a bicycle, Fig. 3 is a transverse section taken on line 3—3 of Fig. 2, Fig. 4 is a partial side elevation of a modified form of sprocket-wheel and Fig. 5 is a section on line 5—5 of Fig. 4.

Referring to the drawings, the wheel 1 represented as the rear wheel of a bicycle is mounted for rotation on an axle 2 on which is mounted the coaster-brake hub 3. The spokes 4 of wheel 1 are secured at their inner ends to the spoke flanges, of which one is shown at 5 in Fig. 3, on the coaster-brake hub 3.

The sprocket indicated generally at 6 is attached to the coaster-brake hub 3 and is used to transmit power to the wheel 1 by means of a sprocket-chain 7 passing over sprocket 6, and passing around a sprocket (not shown) on a motor shaft or shaft from which power is derived.

The sprocket 6 is provided with a hub comprising portions 8, 8' secured together by bolts 9. The radial arms 10 are integral with the hub sections 8, 8' and are provided at their outer ends with yoke portions 11 in which are journaled rollers 12. The sprocket rim 13 provided with teeth 14 is rotatably mounted on rollers 12. Spiral springs 15 connect arms 10 of the hub sections with rim 13, two springs 15 extending in opposite directions from each arm 10. These springs permit the sprocket rim 13 to rotate a certain amount in either direction when the motor is first started before the power is fully applied through the sprocket to the rear wheel. The springs therefore act as shock-absorbing devices to reduce the shock in either direction when power is transmitted from the internal combustion engine to the wheel.

The sprocket is also provided with an annular clamping plate formed in two halves 16, 16'. The hub sections 8, 8' are mounted on the inner side of the left hand spoke flange 5 of the coaster-brake hub 3 and the clamping ring sections 16, 16' on the outer side of the spoke flange 5. The hub sections are provided with peripheral lugs 17 which engage the adjacent side of the spoke flange 5 between the inner ends of the spokes 4, and the sections of the clamping ring 16, 16' are provided with similar projections 18 which are adapted to engage the opposite or outer side of spoke flange 5 between the inner ends of the spokes. Screws 19 extend through the clamping ring sections 16, 16' into the hub sections 8, 8' when the sprocket is assembled to clamp the hub in position against the inner surface of the spoke flange 5 of the coaster-brake hub.

The hub is also provided with three or more screws 20 which extend radially through bosses on the hub members and engage the coaster-brake hub 3. Clamping blocks 21 may be provided at the inner ends of set screws 20 to directly engage hub 3. Screws 20 serve to centralize the sprocket hub and to prevent lateral strains which might bend or spring the spoke flange 5. The sprocket hub is not only clamped to the spoke flange by the clamping ring and screws 19, but also it is prevented from revolving by the projections 17 and 18 of the sprocket hub and clamping ring coming into contact with the spokes. The sprocket hub, as stated, is made of two parts in order to make installation of the same possible without dismantling the bicycle wheel. The clamping plate 16, 16' is preferably divided in sections, as shown, in order to permit the use of the same with various makes of bicycle and coaster-brake, including coaster-brakes which have enlarged ends outside the spoke flange.

A modified form of sprocket is partially illustrated in Figs. 4 and 5. In this form, the rim 13 is slidably mounted in guides on the arms of the hub instead of being mounted on the rollers 12. As illustrated, each arm 10' is formed at its outer end with an offset portion 22, a slideway or guide for the rim 13 being formed between portion 22 and a curved plate 23 which may be screwed or otherwise secured to the arm 10' as shown.

While the construction has been described and illustrated as a sprocket having a sprocket-chain running over the same, it is obvious that a belt might be substituted for the chain 7, in which case a pulley rim obviously takes the place of the sprocket rim 13. The sprocket described is adapted to be readily installed on various forms of bicycle wheel, or other spoked wheel, without alteration of the latter, makes possible a substantial application of power to a bicycle or similar wheel, and is so constructed as to prevent strains on the bicycle or other device with which the wheel is used, by shocks from the motor. It also prevents the motor impulses from tending to slip the tire on the rim of the wheel or on the road, in the case of a bicycle, and acts as a cushion device to absorb the excess force of the motor at the times of motor impulse.

What I claim is:—

1. In a device of the character described, the combination of a bicycle wheel having spokes and a hub having a spoke flange, and a sprocket-wheel comprising a hub portion and a clamping plate engaging opposite sides of said flange and secured together, said hub portion and clamping plate having projections extending between the spokes adjacent to their connection with the spoke flange, substantially as set forth.

2. In a device of the character described, a sprocket-wheel adapted to be detachably secured to the hub and spoke flange of a bicycle wheel, comprising a divided hub, clamping plate and rim supported from said hub, the hub sections having means for securing them together, said hub and clamping plate having means for drawing them together on opposite sides of the spoke flange, and means for securing said hub to the bicycle wheel hub, substantially as set forth.

3. In a device of the character described, a sprocket-wheel comprising a hub with outwardly extending arms, said arms having yoke portions at their outer ends, rollers journaled in said yoke portions, a sprocket flange rotatably mounted on said rollers, and springs extending in opposite directions from each arm connecting the same with said flange, substantially as set forth.

4. In a device of the character described, a sprocket-wheel adapted to be detachably secured to the spoke-flange of a bicycle wheel, said sprocket-wheel comprising a divided hub with integral outwardly extending arms and means for securing the hub sections together, a rim carried by said arms, a divided clamping ring with means for drawing the same toward said sprocket-wheel hub, with said spoke flange clamped between the same, and set screws extending radially through said sprocket-wheel hub, said hub and clamping ring having projections on their adjacent faces adapted to engage between the spokes attached to the said spoke flange, substantially as set forth.

This specification signed and witnessed this 13th day of February, 1917.

LOUIS J. JOHNSON.

Witnesses:
HAZEL JUDY,
CLARA A. HENDRICKS.

Copies of this patent may be obtained for five cents each, by addressing the "Commissioner of Patents, Washington, D. C."